United States Patent [19]

Woodward

[11] Patent Number: 5,034,054
[45] Date of Patent: Jul. 23, 1991

[54] PROCESS FOR TREATING MERCURY IN PREPARATION FOR DISPOSAL

[75] Inventor: Jeffrey C. Woodward, McLeansville, N.C.

[73] Assignee: Ecoflo, Inc., Greensboro, N.C.

[21] Appl. No.: 375,246

[22] Filed: Jul. 3, 1989

[51] Int. Cl.$^5$ .......................... C22C 1/05; C22C 7/00
[52] U.S. Cl. ...................................... 75/388; 420/526
[58] Field of Search .............. 420/526, 527, 498; 405/129; 266/169; 75/0.5 R, 109, 388; 210/914

[56] References Cited

U.S. PATENT DOCUMENTS

| | | | |
|---|---|---|---|
| 413,438 | 11/1889 | Eggers | 420/526 |
| 1,207,703 | 5/1916 | Basehore et al. | 420/526 |
| 1,317,886 | 10/1919 | Muchow | 420/526 |
| 2,149,782 | 3/1939 | Lucas | 420/526 |
| 3,674,428 | 7/1972 | Dean et al. | 210/914 |
| 3,804,751 | 4/1974 | McCord et al. | 210/914 |
| 3,915,691 | 10/1975 | Sakagami et al. | 75/0.5 R |
| 3,975,298 | 8/1976 | Seidenberger | 502/401 |
| 4,076,553 | 2/1978 | Seidenberger | 75/388 |
| 4,104,188 | 8/1978 | Nicaise | 420/526 |
| 4,147,626 | 4/1979 | Findlay et al. | 210/914 |
| 4,164,419 | 8/1979 | Kaji et al. | 75/388 |
| 4,614,592 | 9/1986 | Googin et al. | 210/679 |
| 4,844,815 | 7/1989 | Ader et al. | 405/129 |

FOREIGN PATENT DOCUMENTS

| | | | |
|---|---|---|---|
| 0295163 | 8/1928 | United Kingdom . | |
| 1242585 | 8/1971 | United Kingdom | 420/256 |

Primary Examiner—Richard O. Dean
Assistant Examiner—David W. Schumaker
Attorney, Agent, or Firm—Rhodes, Coats & Bennett

[57] ABSTRACT

Mercury is mixed with an inorganic powder resulting in a permanent bonding of the mercury to the powder in a solid form. Thereafter the amalgam may be easily, safely, and legally deposited in a landfill. Suggested powders include copper, zinc, nickel, and sulphur in a ratio of powder to mercury of substantially 3:1. The mixture is followed by compound agitation.

7 Claims, No Drawings

PROCESS FOR TREATING MERCURY IN PREPARATION FOR DISPOSAL

BACKGROUND AND SUMMARY OF THE INVENTION

The present invention is directed to the disposal of mercury, and more specifically to the transformation of the normally liquid mercury into a solid form, so that it may be disposed of in landfills.

Mercury is a unique metal in that it is the only metal that exists in liquid form at or near room temperature. In fact, the melting point of mercury is at approximately −38° F. (−39° C.). As such, the disposal of mercury has become quite a problem for waste disposal authorities. Existing laws of the Environmental Protection Agency prohibit the burial of mercury in liquid form in landfills. Mercury is therefore on the list of liquid hazardous waste which cannot be buried. Since it is impractical to maintain mercury at temperatures less than −38° F. in landfills, other means of disposal must be utilized. Mercury cannot be incinerated, because of the emission of mercury vapor which is highly undesirable and toxic.

While the disposal of mercury remains a problem, waste mercury is being generated every day from laboratories who use mercury in testing procedures, from many manufacturers who build products having mercury therein, and from scrap products having mercury therein such as thermometers, vacuum tubes, x-ray tubes, thermostats, and the like. Presently, and as a practical matter, there is no legal way to dispose of liquid mercury waste. That is the problem addressed by the present invention.

One attempt to clean up mercury spills comprises the use of a lead powder and an inorganic acid. The lead powder and inorganic acid (sulfuric acid) are mixed and poured onto the spill. Although the mercury will affix itself to the lead because of the acid, there results an attendant chemical reaction leaving an acid residue. For two reasons, this approach has not proven desirable for mercury disposal. First of all, the lead is prohibitively expensive. Secondly, the acid residue is itself a hazardous waste that requires disposal.

Previously, as disclosed in U.S. Pat. No. No. 3,704,875 to Waltrich and U.S. Pat. No. 4,230,486 to Capuano et al., it has been known to recover mercury from a liquid by contacting the liquid with particles of reactive metals such as zinc, magnesium, aluminum, iron, and silver. While such methods may be appropriate for recovering mercury from liquids, they fall far short of recognizing the disposal problem and suggesting an economical process for disposing of mercury in landfills.

In accordance with the invention, and in its broadest aspects, the present invention then is directed to a treatment for liquid mercury which prepares it for suitable disposal in landfills. Toward this end, an inorganic powder is added to the mercury. The powder has the characteristics of forming an alloy or amalgam when added to mercury in sufficient amounts and when subsequently properly agitated. The powder and mercury are preferably placed in a disposable container and subjected to non-intrusive, compound agitation. The container with the amalgam therein is deposited in a landfill cleanly, neatly, and in compliance with EPA standards. There are no containers or mixers remaining to be cleaned of liquid mercury.

In general, powders which will form amalgams when added to mercury include include reactive transitional metals plus sulphur. More particularly, it appears that copper is the preferred powderous material, however, nickel, zinc, or sulphur also appear to have potential.

The powderous or particulate material is added to the mercury in a powder to mercury ratio of at least 1:1, and preferably more on the order of 3:1. There is no upper limit as to how much powder can be used, so one can add as much powder as is economically feasible.

The powder/mercury mixture is then placed in a container, placed on a shaker device, and subjected to non-intrusive compound agitation. It has been found that other types of intrusive agitation or reciprocal agitation are not satisfactory.

It is therefore an object of the present invention to economically prepare mercury for disposal.

It is another object of the present invention to provide a technique for treating mercury for disposal by adding an inorganic powder to the mercury to form an amalgam.

Other objects and a fuller understanding of the invention will become apparent from the reading the following detailed description of a preferred embodiment.

The mercury to be treated arrives at the treatment site in liquid form, and generally in glass, plastic or porcelain containers. The first step of the disposal process is the place the liquid in some sort of disposable container, such as a plastic bottle, in which the amalgam is subsequently formed. A selected inorganic powder is added, preferably at a powder to mercury ratio of substantially 3:1. While 3:1 is the preferred ratio, a ratio of at least 1:1 should be used for satisfactory results. The disposable container with the mercury and powder therein are then placed in an appropriate shaker device for compound agitation. Testing has proved that reciprocal agitation, even for extended periods, will not provide a satisfactory amalgam. However, similar tests prove that compound agitation does result in complete bonding of the mercury to the powder. A satisfactory compound agitator has been found to be a paint, mixer, Model No. 5400-02 or 5410-02 manufactured and marketed by Red Devil, Inc. of Union, N.J. or equivalent.

Several types of inorganic powders should satisfactorily bond the mercury thereto. First of all, while it is believed that all transitional metals would satisfactorily bond mercury, some are very rare and/or very expensive. Therefore, copper, nickel and zinc appear to be preferred. Also, while sulphur is not a transitional metal, since mercury is normally found in the form of cinnabar (HgS), it provides an excellent material for binding mercury thereto for disposal. It has not yet been determined whether the sulfide gas given off will be within EPA regulations or not, however, if acceptable, the sulphur powder provides an excellent bonding material.

The time of agitation may vary depending upon the type of powder selected. For example, copper powder should be agitated for at least 15 minutes and preferably 40 minutes. On the other hand, when sulphur is the selected powder, it has been found that a minimum of 5 minutes of compound agitation is necessary and preferably 20 minutes is preferred.

At the present time, it is known that reciprocal agitation simply does not result in sufficient amalgamation to be acceptable. It is also known that compound shaking or agitation using a mixer of the type represented by the Red Devil Models 5400 and 5410 paint mixer does result in an acceptable amalgam. It is believed that other types of non-intrusive agitation, such as tumbling may well prove satisfactory, although no experiments have been run. It is also believed that various types of intrusive agitations such as blending, beating, ball mills, and the like may satisfactorily amalgamate the powder/mercury mixture, however, intrusive procedures, in and of themselves, very possibly lead to other problems. For example, the intrusive device must itself either be cleaned or disposed of. If the mercury adheres to the surface of the agitation device, the agitation device itself may have to be disposed of. Therefore, it is believed that nonintrusive types of agitation are preferred. Nonintrusive types of agitation maximize the convenience, in that the powder/mercury mixture can be placed in a disposable container, placed on the compound agitator, and then the entire container and its contents be disposed of simply and economically.

In experimenting with the invention to determine what type of powder is best and what agitating times are preferred, several tests were conducted. Results of the tests are as follows:

EXAMPLE 1

Approximately 1 pint of mercury in liquid state is placed in a disposable polymeric bottle or container. A copper powder was added in an amount sufficient to provide a copper/mercury ratio of 3:1 at room temperature. The mixture was subjected to compound agitation in the aforedescribed Red Devil mixer, Model No. 5400-02 for 40 minutes. It was noted after 15 minutes that substantial amalgamation had occurred, however, 40 minutes provided the optimum results. The resulting amalgamation resembles a powderous copper appearance satisfactory for disposal in landfills.

EXAMPLE 2

The same amount of mercury as described in Example 1 was placed in a disposable polymeric container, however, copper powder was added only sufficient to provide a powder/mercury ratio of 1:1. At the end of 45 minutes of compound agitation, considerable some amalgamation had occurred, however, a small amount of liquid mercury remained. It was therefore determined that a ratio of powder/mercury greater than 1:1 was preferred.

EXAMPLE 3

The test of Example 1 was repeated with the exception that sulphur powder was provided in a ratio of 3:1, rather than the copper powder. The amalgamation of mercury onto the copper powder occurred more quickly. It was noted that after 5 minutes of compound agitation, amalgamation had occurred, and the optimum time was determined to be 20 minutes.

While this test proves successful as far as solidifying the mercury into a solid powder, there resulted a mercuric sulfide gas. At the present time, it is not known whether this procedure will meet the standards of the Environmental Protection Agency for the emission of gas fumes, however, it is contemplated that it either now meets such standards, or will do so in the future. Therefore, this procedure appears to result in an acceptable process.

EXAMPLE 4

The combination of copper powder and mercury, as described in Example 1, were placed into a container and subjected to reciprocal agitation. At the end of two hours, there still remained an unacceptable high amount of liquid mercury beads within the mixture, evidencing that complete amalgamation had not occurred.

While preferred embodiments are described in detail hereinabove, it should be recognized that various changes and modifications might be made without departing from the scope of the invention which is set forth in the accompanying claims.

What is claimed is:

1. Process for solidifying collected quantities of liquid metallic mercury preparatory to disposal in a solid waste landfill comprising the steps of mixing an inorganic powder consisting essentially of an element selected from the group consisting of copper, nickel, zinc, and sulphur with said liquid metallic mercury in a ratio of powder to mercury of at least 1:1 by weight and subjecting the mixture to non-intrusive compound agitation for at least 5 minutes, wherein said inorganic powder is of a type having the characteristics of binding mercury thereto and whereby the combination of the inorganic powder and compound agitation solidifies the liquid metallic mercury.

2. The process according to claim 1 wherein said ratio of powder to mercury is substantially 3:1 by weight.

3. The process according to claim 2 wherein said powder is copper and the time of compound agitation is at least 15 minutes.

4. The process according to claim 3 wherein said time of agitation is substantially 40 minutes.

5. The process according to claim 2 wherein said powder is sulphur and the time of agitation is at least 5 minutes.

6. The process according to claim 5 wherein said time of agitation is substantially 20 minutes.

7. The process according to claim 1 wherein said powder and mercury are placed in a disposable container prior to said step of non-intrusive compound agitation whereby, upon completion of the mixing operation, the amalgam and container are deposited in a landfill as a unit.

* * * * *